United States Patent Office 3,332,266
Patented July 25, 1967

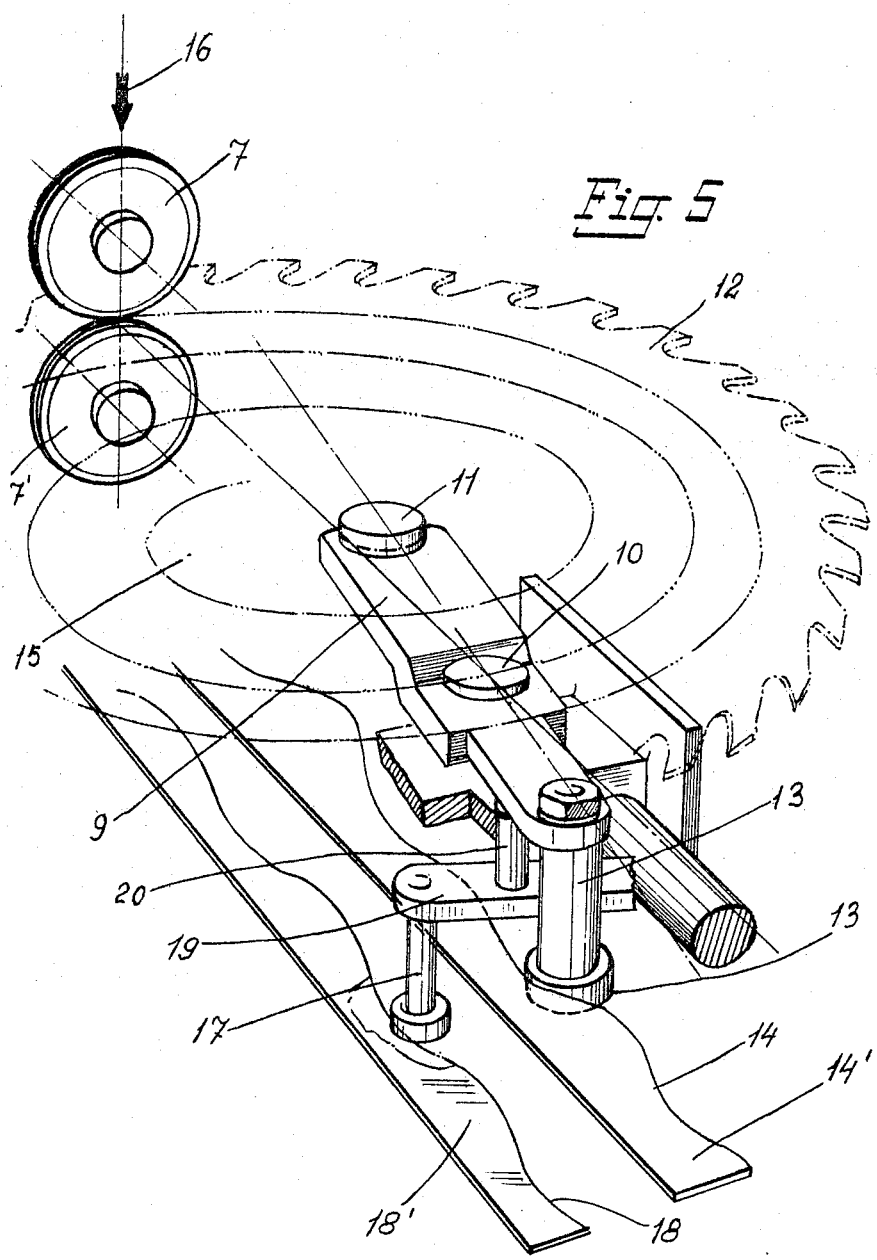

3,332,266
MACHINE FOR STRETCHING CIRCULAR METAL DISCS, IN PARTICULAR CIRCULAR SAW DISCS
Bengt Karl Arne Kullman, Frimurarvagen 10, Skarholmen, near Stockholm, Sweden, and Axel Eugen Lundberg, Tallberga, Sundsvall, Sweden
Filed Feb. 2, 1965, Ser. No. 429,854
7 Claims. (Cl. 72—94)

ABSTRACT OF THE DISCLOSURE

A machine for rolling circular saw discs or the like between disc shaped rollers in order to prevent the discs from vibrating or fluttering as they are rotated in operation. The machine is provided with a journal pin for the discs which is displaceable with respect to the rollers in such a manner that the discs may be rolled in several zones between a center opening and the periphery thereof, and with an automatically operating device, preferably controlled by a cam and a cam follower, for varying the rolling pressure and the spacing of the zones.

---

The present invention relates to a machine for stretching or cold working circular metal discs, particularly circular saw discs. For convenience, the machine will be described below with reference to saw discs, although it is to be understood that the invention is not so limited. It should be noted that such a stretching or cold working for saw discs is necessary to prevent the discs from vibrating or "fluttering" in operation.

Broadly, the machine comprises a frame wherein by means of drive shafts are rotatably carried two juxtaposed disc-shaped rollers, between which the saw discs are rolled in a manner to cold work or stretch the material of the discs by a variable roll pressure. Further, the machine has a journal for the saw discs which journal is displaceable relatively to the rollers so that the discs may be stretched in a plurality of zones between the centre and the outer periphery thereof.

With the machines as hitherto known it has not been possible to achieve a uniform and automatically controllable stretching of saw discs. It is true that the machines are performing a kind of stretching, but both the roll pressure and the operation period have to be manually controlled. Therefore, to ensure proper stretching, a great deal of skill of the operator is required, and with the previously known machines it may be considered as being entirely impossible to ensure a uniform stretching of a great number of saw discs.

The primary object of the present invention has been to provide a machine wherein the above discussed drawbacks are entirely eliminated.

To the just mentioned end the machine according to the invention is characterized essentially in that it is provided with adjustable, automatically operating control means for varying the roll pressure of the rollers and the roll course spacing to provide for a predetermined amount of stretching of the saw discs.

The machine is of the type wherein the saw discs are supported by a slide, slidable substantially in the plane of the axis of the roll drive shafts and disposed on a bracket on the machine frame, and the machine is further characterized in that the slide is provided with a support arm, pivotally mounted on a pivot pin for swinging movements transversely of the sliding direction of said slide, said arm being provided with a journal pin for the centre bore of the saw disc, and in that to the said support arm is connected an automatically operating control member for swinging said support arm, said pivot pin and saw disc carried thereby being swingable with respect to the direction of movement of the slide in such a manner that the saw disc centre is displaceable with respect to a line in the common plane of the roller drive shaft axis and crossing said pivot pin, so as to bring about spiral-shaped stretching courses between the centre of the saw disc and the periphery thereof.

Further, the machine is characterized in that on said bracket is displaceably and lockably disposed a tailstock, adapted to controllably limit the movement of the slide in dependence of the diameter of the saw disc, and being further provided with locking means for engagement with latch means on said slide.

One embodiment of the machine according to the invention will be disclosed in more detail below with reference had to the accompanying drawings, wherein:

FIGURE 5 illustrates in a schematic perspective view the machine in operation during stretching of a circular saw disc.

Figure 1:
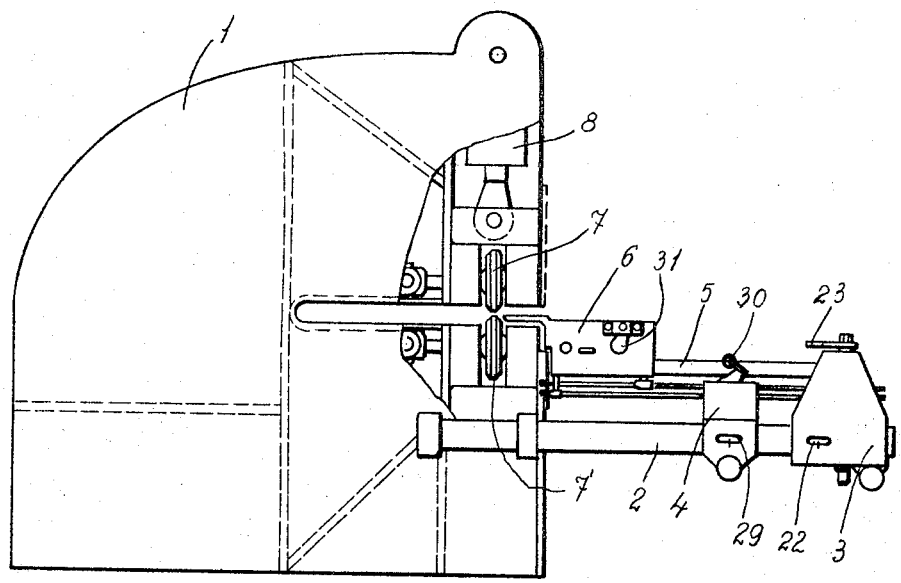
FIGURE 1 illustrates the machine in side view and partly in section, where the slide is shown in an inner end position.
Figure 2:
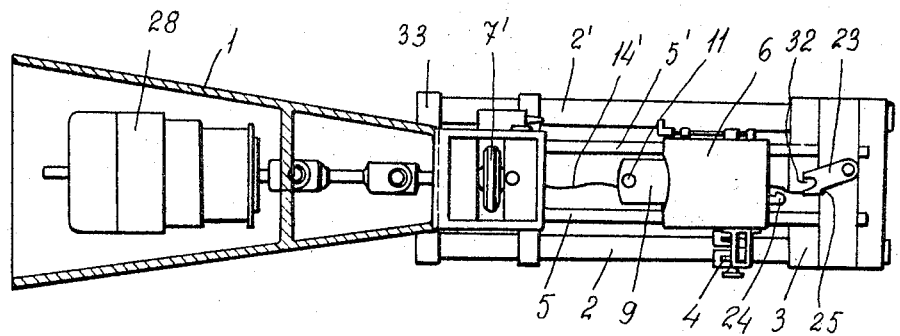
FIGURE 2 is a plan view of the machine, partly in section, where the slide is shown in its outermost position.
Figure 3:
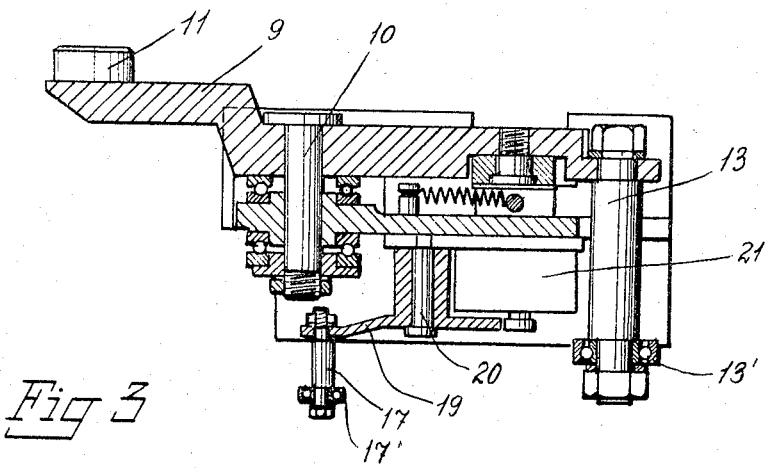
FIGURE 3 shows, to an enlarged scale, the slide in a vertical longitudinal section.
Figure 4:
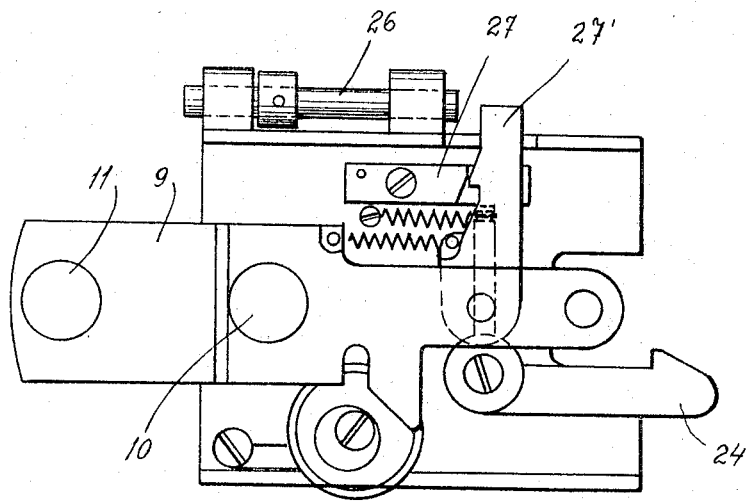
FIGURE 4 is a top plan view of the slide in the same scale.

On the drawings there is shown a frame 1, having two parallel horizontally directed support arms 2, 2' which slidably carry a tailstock 3 and a speed switch 4. In parallel with the support arms 2, 2' and above the same there are disposed two rails 5, 5' which slidably carry the slide 6. In the frame 1 two disc-shaped rollers 7, 7' are rotatably carried on shafts which rollers are disposed in one and the same vertical plane and are rotating in opposite directions. The lowermost roller 7' is disposed on a fixed level whereas the uppermost one 7 is vertically adjustable towards and away from the lowermost one 7' by means of a hydraulic cylinder 8. The slide 6 is provided with a support arm 9 which is swingable around a pin 10 on the slide 6. At one end the said arm 9 has a vertical journal pin 11 for the centre bore of the saw disc 12, so as to permit said disc to rotate around the pin 11 and to be displaced laterally by moving the swingable support arm 9. At its other end the support arm 9 is provided with a guide pin 13, carrying a roller bearing 13' and adapted to follow a graphical curve 14 on a guide ruler 14', interchangeably secured to the frame. The curve 14 is automatically controlling the swinging movements of the support arm 9, and thus the lateral displacement of the journal pin 11 with respect to a centre line 15 through the axis of the pin 10 and a vertical central plane 16 containing the axis of the rollers 7, 7'. The indicated displacement of the journal pin 11 with respect to the said centre line 15 is necessary to ensure that the rollers roll on the saw disc 12 in spiral-shaped courses.

The slide 6 has a movable sensing member in the shape of a vertical guide pin 17, having a roller bearing 17' to follow a graphical curve 18 on a guide ruler 18' interchangeably secured to the frame. The guide pin 17 is carried by a horizontal swing arm 19, swingably journalled on a pin 20 on the slide 6. The swing arm 19 is adapted to control a potentiometer 21 which in turn controls the hydraulic cylinder 8 through an electrical control unit so as to provide a pressure of the uppermost roller 7 on the saw disc 12, the said graphical curve 18 on the ruler 18' being provided to serve as an impulse-giving member for the variation of the said pressure.

The tailstock 3 displaceably mounted on the support arms 2, 2' is provided with a scale 22 for setting a suitable operating range of the rollers 7, 7' in dependence of the diameter of the saw disc. On the upper side the tailstock 3 has a swing arm 23, adapted to be swung by means of a start handle as the operation cycle is to be started. The guide pin 13 which is initially disposed in the bifurcated end 32 of the arm 23 will now swing the arm 9 around its pin 10 so as to displace the journal pin 11 away from the line 15 to such an extent that a return latch 27' pivotally journalled on the support arm 9 engages with a latch abutment 27 and arrests the support arm 9 in this position, also after release of the said start handle, which is preferably spring-biased.

The arm 23 is connected to electric switches on the tailstock 3. On swinging the arm 23 certain switches are actuated in such a manner that the rollers 7, 7' start to roll on the saw disc 12. However, only those contacts are actuated which provide for a very low pressure as compared to the stretching pressure proper (the said low pressure does not follow the pressure curve), for which reason no actual stretching is started at this moment. What is started is the movement of the slide 6 and the saw disc 12 so that the disc centre is rapidly approaching the rollers to enable them to start with the stretching operation. This stretching operation can take place only when a rod 26 has released the latch 27, 27' so as to release the support arm 9 to swing the pin 11 and the saw disc back beyond the centre line 15 to bring about a feed in opposite direction, as will be disclosed in more details below. As the latch 27, 27' is being released the slide 6 actuates an electric contact 33 so that the actual stretching pressure is applied to the roller 7 (viz, the pressure which is then following the pressure curve).

However, to return to the moment when the slide 6 is approaching its innermost position it will be realized that the above mentioned rod 26 by abutting against the frame will be displaced in a manner to release the latch 27, 27' which in turn is releasing the support arm 9. Then, due to the rotation of the rollers, the pin 11 is displaced beyond the centre line 15 as far as the guide members 13, 13' and 14, 14' permit (and it is at this moment the actual stretching commences). Naturally, this rolling of the rollers on the saw disc in spiral-shaped courses brings about a displacement of the slide 6 along its rails.

The tailstock 3 carries electric contacts to be actuated by the slide 6 as this returns after a completed operational cycle. These contacts control the operation of the rollers 7, 7' on the saw disc 12 in such a manner that this operation is terminated. Further, the slide 6 pivotally carries a latch 24 to engage with a recess 25 in the arm 23. When the slide 6 returns to its initial position (latched rest position) after a completed operational cycle, the latch 24 pivots to engage with the recess 25 in the arm 23, and the guide pin 13 enters the bifurcated end 32 of the arm 23.

The speed switch 4 enables a control of the speed of the drive motor 28 of the rollers, which motor is preferably arranged controllable for two speeds, viz, one speed for the outermost portion of the saw disc and one speed for the innermost portion thereof. The speed switch is provided with a scale 29 to enable setting along one of the support arms 2 in dependence of the diameter of the saw disc 12. The switch has an electric contact member 30 adapted to be engaged by a contact member 31 on the slide 6.

The operation is as follows:

The stretching is carried out between the disc-shaped rollers 7, 7' which have their shafts parallel in all respects, and the frame is designed so as to freely accommodate a saw disc of a predetermined size between the peripheries of the rollers, independent of which point of the saw disc which is momentarily disposed between the rollers as the saw disc is rotatably carried by the journal pin 11. The movement of the movable roller 7' takes places transversely of the axis of the rollers and in the common plane containing the axis of the rollers. The movable roller may be advanced towards the fixed roller and be pressed on to the same with a predetermined pressure under the control of a potentiometer and through a hydraulic pressure control valve. Through these means the said pressure may be varied from zero to a maximum value. Naturally, any pressure may be applied if and when desired, viz, by utilizing fixed resistors.

The two rollers which have the same diameters are driven in synchronism in opposite directions. The uppermost roller is driven through universal joints from the twin-speed motor with a suitable gearing, disposed in the frame.

When a circular saw disc is freely suspended on the journal pin and is placed between the rollers so that the axes thereof in all planes become parallel with lines from the saw disc centre to the points on opposite sides of the disc where the rollers contact the disc, and the rollers are then rotated while a certain pressure is forcing them towards each other, the saw disc is brought to rotate with a speed and direction of rotation which are directly dependent of the speed and rotational direction of the rollers. The portions of the saw disc disposed circularly around the centre thereof which are thus caused to pass between the rollers are subjected to a certain stretching, the magnitude of which is dependent of the peripheral speed of the rollers and the pressure, under which they are pressed on to the surface portions of the disc. Naturally, also the design of the rollers has an influence. Furthermore, the spacing of the roll courses within the total stretching zone would have a very essential effect.

If on the other hand the centre of the saw disc is displaced in such a manner that lines on each side of the disc, drawn from the centre thereof to the points of contact of the rollers, include an angle with a plane containing the axis of both rollers, a certain feed will be obtained, provided that the centre journal pin of the disc is freely displaceable along a line in parallel to the said axis of the rollers. In this case the peripheral edges of the rollers will stretch the saw disc along spiral-shaped courses.

Naturally, the pitch of the spiral-shaped courses is directly dependent of the magnitude of the above mentioned included angle, and by decreasing and increasing this angle, respectively, it is possible to decrease and increase, respectively, the said spiral course pitch at will. The just discussed variation of the said angle may easily be achieved by permitting the centre of the saw disc to follow a separate curve, the base of which would be parallel to the axis of the rollers. Naturally, the just mentioned angle is never to be permitted to decrease down to zero, as this would imply that the feeding movement would terminate. However, by designing the said curves in a suitable manner the pitch of the spiral-shaped courses may be given any desired value, and furthermore, this pitch may be varied at will, at any distance from the centre of the saw disc.

Further, by utilizing a graphical curve, the base of which would be parallel to the axis of the rollers, for controlling a potentiometer which may be stationary whereas the curve would move along a path in parallel with the feed direction (parallel to the axis of the rollers) the above mentioned hydraulic assembly might be caused to apply any desired pressure, which pressure may be varied at will at any distance from the saw disc centre, independent of the momentary pitch of the spiral-shaped courses, naturally provided that the pitch is above zero, as otherwise no pressure variation may be derived from the pressure control curve.

The drive motor of the rollers, which is of the twin-speed type, is controlled by circuit breakers, which are in turned controlled by micro-switches on the frame. These mciro-switches are in turn controlled in dependence of the feed in such a manner that the lower speed occurs when the rollers are working on the smaller diameters of the saw disc, whereas the higher speed occurs when the rollers are working on ths larger diameters of the saw disc. Essentially, this is to balance out the variation of the saw disc speed which is the result of the varying transmission ratio between the rollers and the saw disc as the latter is rotated by the rollers with engagement on different diameters.

Preferably, the stetrching is to be carried out from adjacent the centre of the saw disc and outwardly, as the periphery of the disc would otherwise easily tend to become sawed, in particular as the stretching is commenced. However, the machine has been designed in such a manner that the operational cycle is started when the journal pin on which the saw disc is carried is in a position remote from the rollers (the so-called latched rest position) viz, so as to facilitate the insertion of a saw disc in the machine. At this moment the machine should be adjusted into a position where the rollers are situated adjacent the periphery of the disc. Now the start takes place in such a manner that the centre of the disc is displaced from the above mentioned line in the same plane as that of the rollers axis, and this displacement takes place in direction opposite to that which is normally prevailing when the stretching is carried out. Then, the centre is latched in this position, which may be brought about mechanically, if desired. Through micro-switches, and similarly as a consequence of the starting movement with the attendant latching of the centre, the rotation of the rollers and the hydraulic pressure (the latter by means of a separate coupling) are then started in such a manner that the movable roller approaches the saw discs and rolls on the same under a variable pressure, which may be adjusted by means of a separate potentiometer, if desired. When the disc is now put in rotation and the said centre is displaced so as to bring about a feeding motion, this feeding motion brings the centre of the disc to approach the rollers comparatively rapidly, while the rollers are still not exerting any stretching action on the saw disc. When the position has been reached in which the centre of the disc has approached the rollers as much as the mechanical design permits the feeding motion releases the latch which has up to now been latching the centre in position displaced from the above discussed central plane containing the axis of the rollers so that the tangential force of the peripheral surfaces of the rollers causes the centre of the disc to swing back to and beyond the said line to the extent which the graphical feed curve permits.

At the same time as the mechanical latch is released or slightly in advance of this moment the feed motion also actuates a micro-switch which causes the hydraulic pressure to follow the graphical pressure curve. By designing the feed curve in such a manner that the same always permits the centre of the saw disc to be slightly displaced from the central plane of the roller axis a continuous feed outwardly of the saw disc is ensured so that the rollers will finally operate on the peripheral parts thereof provided that the pressure curve is designed in such a manner that the hydraulic system is always exerting such a pressure that a sufficient pressure between the rollers and the saw disc is obtained, viz, for feeding the saw disc and the slide which carries the saw disc through the central journal pin.

The stretching which now commences as set forth above goes on continuously with the pitch and pressure variations which are brought about by the pressure and feed curves that are mounted in the machine for each type of saw disc and each desired stretching operation.

When the stretching has been carried on to the moment when the rollers are operating on the radially outermost portion which is to be stretched, the stretching has to be terminated, to which end the last part of the feed motion through micro-switches on the part which has been previously set to correspond to the diameter of the disc causes the rotation of the rollers to stop and relieves the hydraulic pressure, so that the rollers are moved apart from each other and brought to rest.

The slide which carries the support arm swingably around a pin is locked, similarly through the last part of the feed motion, so that it is then no longer freely slidable in any direction unless a repeated start control is carried out.

In this locked zero-position the operational cycle is terminated, and the saw disc may be removed from its journal pin and replaced by a new one of the same type, after which the stretching machine with a high degree of exactness carries out a similar stretching operation, following a repeated start control.

Naturally, pressure and feed curves of an unlimited number of combinations may be mounted in the machine to cause this to operate in any desired manner with respect to the stretching result and the spacing of the stretched zones of a circular saw disc or a similar circular metal disc.

Within a predetermined range the stretching machine may be adjusted to operate on saw discs of any desired diameter by replacing the pressure and feed curves and by suitably adjusting the means on the frame which is adjustable parallel to the line in the common plane of the roller axis and which means is carrying the rest position latch means and the start mechanism.

The invention is by no means limited to the above disclosed embodiment but the same may be varied in a plurality of different ways within the scope of the inventive idea and within the scope of the appended claims.

What we claim is:

1. A machine for stretching circular metal discs, in particular circular saw discs, comprising a frame wherein there are rotatably carried by means of drive shafts two juxtaposed disc-shaped rollers, between which the saw discs or the like are rolled in a manner to cold work or stretch the material of the discs by a variable roll pressure, and further having a journal for the saw discs which journal is displaceable relatively to the rollers so that the discs may be stretched in a plurality of zones between the centre and the outer periphery thereof, characterized in that said machine is provided with adjustable, automatically operating control means for varying the roll pressure of the rollers and the roll course spacing to provide for a predetermined amount of stretching of the saw discs.

2. A machine as claimed in claim 1 wherein said automatically operating control means comprises a sensing member adapted to follow a fixed cam member on the frame.

3. A machine for stretching a circular metal disc, in particular a circular saw disc, by rolling it between two rotatable rollers having parallel axes, comprising a slide which is displaceable on support means in a direction parallel to said axes and which is provided with a support arm pivotally mounted for swinging movements transversely of said direction, said support arm being provided with a journal pin adapted to be received in a center opening of said disc, and automatically operating control means which is operatively connected to said support arm to controllably swing it about its pivot, said journal pin being disposed on said support arm so as to be displaced transversely with respect to the plane containing said axes as a result of the swinging of said support arm, so that said rollers are brought to follow spiral shaped rolling courses on said disc as said rollers are rotated.

4. A machine as claimed in claim 3 wherein said slide carries a movable sensing member for automatically controlling the pressure exerted on said disc by said rollers.

5. A machine as claimed in claim 3 wherein said slide carries a movable sensing member adapted to follow a fixed cam member on said support to control the pressure exerted on said disc by said rollers.

6. A machine as claimed in claim 3 wherein said support carries a slidable and lockable tailstock adapted to adjustably limit the movement of said slide in dependence of the diameter of said disc, said tailstock being provided with locking means for engagement with latch means on said slide.

7. A machine as claimed in claim 3 wherein said support carries a slideable and lockable speed switch having contact means adapted to be actuated by contact means on said slide so as to automatically control the rotational speed of said rollers.

No references cited.

WILLIAM W. DYER, Jr., *Primary Examiner.*

GERALD A. DOST, *Examiner.*